United States Patent
Spinelli (10) Patent No.: US 6,581,322 B1
(45) Date of Patent: Jun. 24, 2003

(54) BAIT GRINDER

(76) Inventor: Giovanni Spinelli, Via Don Minzioni, 1, I-70010 Sammichele di Bari (IT)

( * ) Notice: Subject to any disclaimer, the term of this patent is extended or adjusted under 35 U.S.C. 154(b) by 0 days.

(21) Appl. No.: 10/048,507

(22) PCT Filed: Jul. 25, 2000

(86) PCT No.: PCT/IT00/00311
§ 371 (c)(1),
(2), (4) Date: Mar. 8, 2002

(87) PCT Pub. No.: WO01/08477

PCT Pub. Date: Feb. 8, 2001

(30) Foreign Application Priority Data

Jul. 30, 1999 (IT) ......................... BA99A0027

(51) Int. Cl.⁷ ............................. A01K 97/02
(52) U.S. Cl. ..................................... 43/44.99
(58) Field of Search ................. 43/44.99; 241/37.5, 241/65, 82.2, 167; 452/155

(56) References Cited

U.S. PATENT DOCUMENTS

| | | | | |
|---|---|---|---|---|
| 2,865,417 A | * | 12/1958 | Waters ..................... | 241/82.5 |
| 3,095,022 A | * | 6/1963 | Schmook ................... | 241/167 |
| 3,249,257 A | | 5/1966 | Nolt | |
| 4,479,614 A | * | 10/1984 | Bernard ..................... | 241/82.2 |
| 4,884,755 A | * | 12/1989 | Hedrington ................ | 241/37.5 |
| 4,959,921 A | * | 10/1990 | Stanish et al. ............. | 43/44.99 |
| 5,205,778 A | * | 4/1993 | Korkuch .................... | 452/155 |
| RE35,048 E | * | 10/1995 | Rudibaugh ................. | 241/65 |
| 5,720,124 A | | 2/1998 | Wentzell et al. | |
| 5,842,303 A | * | 12/1998 | Abraham et al. .......... | 43/44.99 |

FOREIGN PATENT DOCUMENTS

| | | |
|---|---|---|
| AU | 581 537 B | 2/1989 |
| FR | 788 322 A | 10/1935 |
| FR | 1 198 605 A | 12/1959 |
| GB | 207 269 A | 11/1923 |
| WO | WO 98/58539 | 12/1998 |

* cited by examiner

Primary Examiner—Charles T. Jordan
Assistant Examiner—Bret Hayes
(74) Attorney, Agent, or Firm—Alston & Bird LLP (57) ABSTRACT

It is provided a bait grinder (10) adapted for cutting bait fish into chum bait and for grinding it, comprising an oblong housing (11) for feeding by gravity the bait fish; cutting means (30) fastened to lower end of an axial shaft (31); filtering means (33) at the housing outlet cooperating with means for keeping the filtering function thereof, wherein the cutting (30) comprise scything cutting mean (35) which are also means for driving and comprising the chum bait against the filtering mean (33) for grinding them—and shearing cutting means (36) for cutting residual chum bait retained by the filtering means (33) for cutting residual chum bait retained by the filtering means (33), which are in sliding contact with these latter.

12 Claims, 6 Drawing Sheets

BAIT GRINDER

FIELD OF THE INVENTION

The present invention relates to a device for cutting up chunks of bait fish—such as sardine or herring—, commonly termed chum, and for grinding up such chum. Such a device, which will be termed bait grinder, is intended to the baiting of fish having a relatively small size, such as pimps or little tunas. It is also intended to be used in cooperation with, or in place of, the chum dispenser disclosed in the patent application WO 98/58539 and intended to the amateurish baiting of big fish, such as giant tuna, shark and swordfish, known as big game and carried out according to a technique termed drifting, consisting in letting the craft used for fishing go adrift under the action of wind and sea currents.

BACKGROUND ART

U.S. Pat. No. 5,205,778 discloses a bait chummer whose cutting means consist of a plurality of spaced apart circular saw blades mounted on a rotatable shaft, which is intended to be manually driven by means of a hand crank and arranged within the central duct of a housing intended to feed the cutting means by gravity.

U.S. Pat. No. 3,249,257 discloses a bait chummer whose cutting means consists of a knife in the form of a reciprocating piston intended to act on the fish contained in a chute having a wall synchronically movable with the piston, which is perpendicular to the axis of such a chute, at the level of an outlet of this latter.

BRIEF DESCRIPTION OF THE INVENTION

The present invention seeks to provide an improvement for such an amateurish fishing by providing a bait grinder as specified in claim 1 attached to this disclosure. Other features of such a device are specified in the claims dependent on claim 1 and also attached to this disclosure.

An advantage which may be obtainable with the present invention is avoiding to mess the craft and the fisher's hands as well, while ensuring a relatively high operation range and a relatively low energetic consumption.

BEST MODE OF CARRYING OUT THE INVENTION

A preferred embodiment of the present invention is disclosed below, by way of example only, with reference to the following figures attached to this disclosure and synthetically summed up hereinafter:

FIG. 4a and FIG. 4b are two alternative embodiment of the pierced disk intended to cooperate with the double blade cutting helix and the counter-blade shown developped in a plan in FIG. 3a and in FIG 3b, whereas FIG. 4c shows the double blade cutting helix shown in a plan and mounted on the alternative embodiment of the pierced disk corresponding to FIG. 4a, the portion of such a disk below the double blade cutting helix being seen showing through;

FIG. 5a is a plan view of the shaped embodiment of the double blade cutting helix, whereas

FIG. 6a is a front view, whereas

Figure 1:
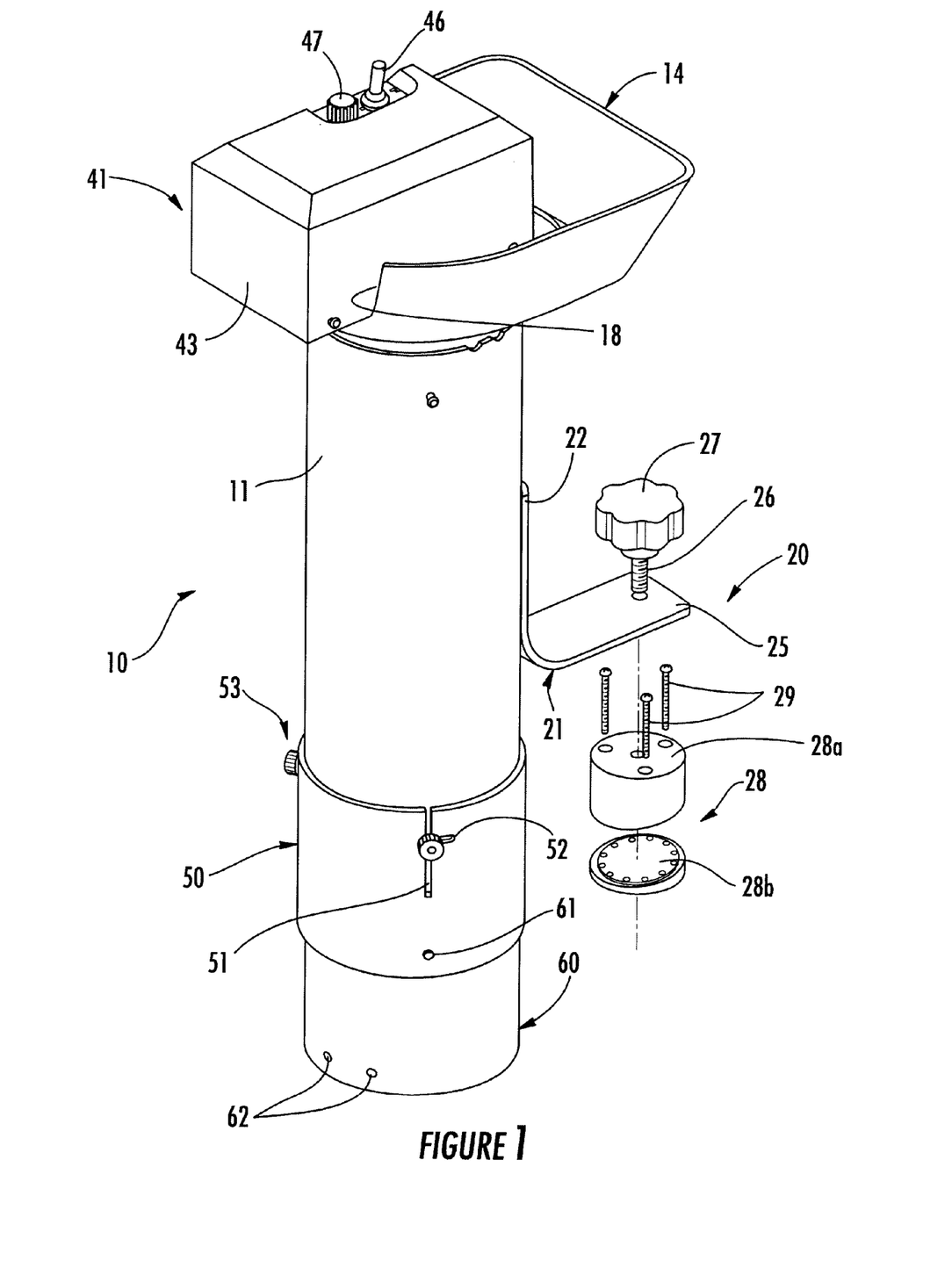
FIG. 1 is a perspective view of a preferred embodiment of the invention.

The device 10 according to the invention (see FIG. 1 and FIG. 2) comprises an oblong housing 11 consisting of a cylinder having a vertical axis with an inlet 12 at the top end thereof, through which bait fish (not shown, but consisting of sardines, herrings, pimps or other species), are fed and an outlet 13 at the bottom end thereof, from which the fed fish get out grinded by the means according to the invention which will be disclosed hereinafter.

Figure 2:
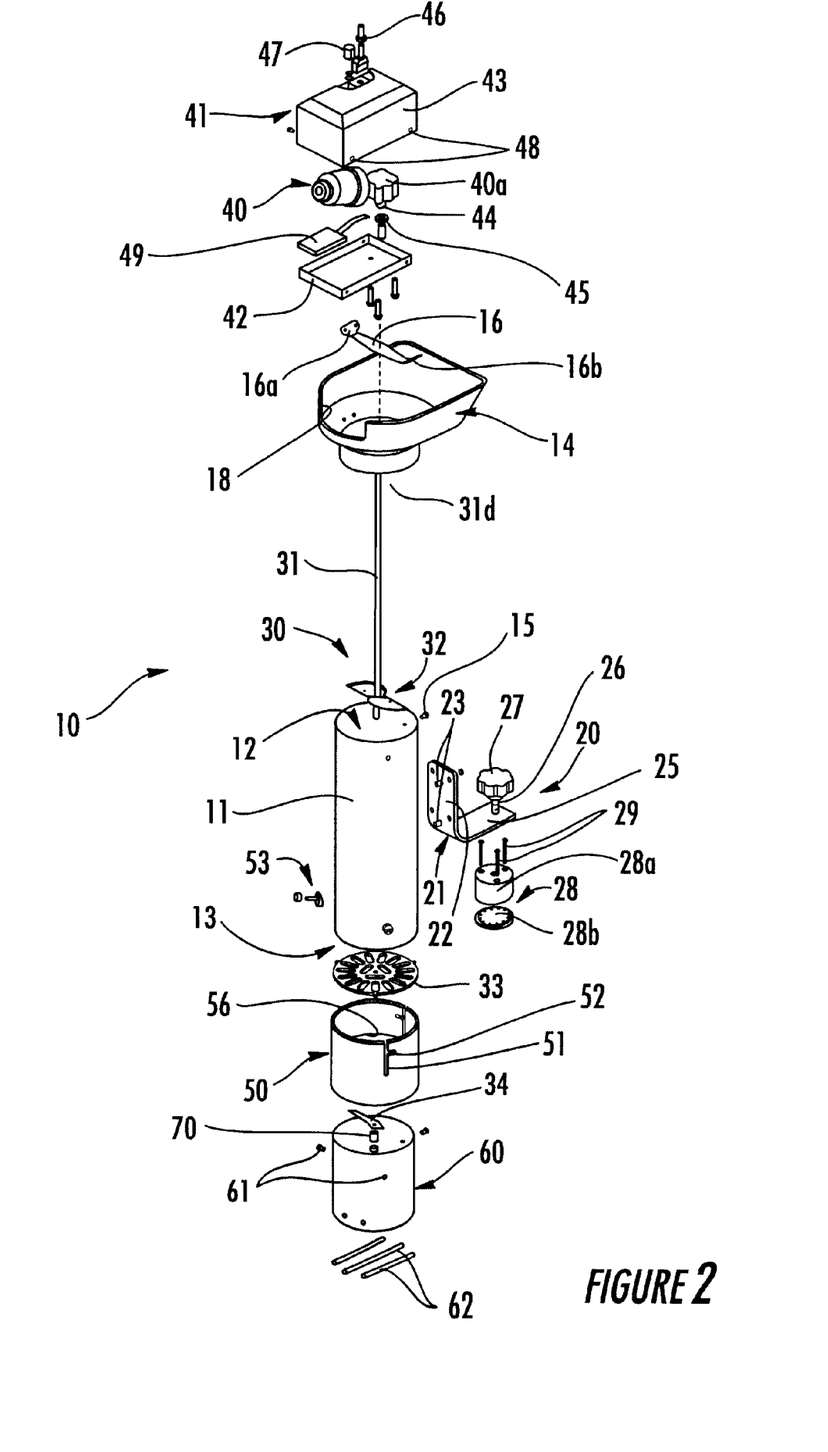
FIG. 2 is an exploded view of the device shown in FIG. 1.

Fastening means 20 allow the anchoring of the housing 11 to a craft (not shown), while letting this latter lean above the sea water. Such fastening means comprise an L-shaped stirrup 21, whose vertical wing 22 is intended to be fastened to the wall of the cylinder 11 by means of screws 23 and the corresponding nuts, whereas the horizontal wing 25 is intended to be fastened, by means of a screw 26 having a head shaped as a manoeuvring knob 27, to a fastening device 28: this latter is intended to compensate the possible slope of a support basis of the craft and comprises two superimposable pieces 28a and 28b, which get in contact with one another through a sloping surface and can rotate one in relation to the other in order to ensure the fastening of the housing to any type of craft in a substantially vertical position; the fastening to the craft is obtained by means of screws 29 intended to be covered by the horizontal wing 25.

Figure 3A:
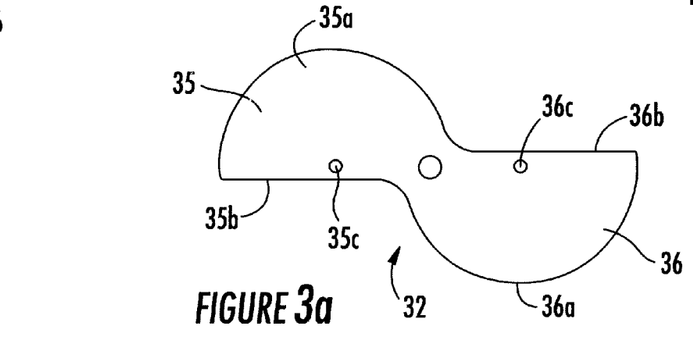
FIG. 3a, FIG. 3b and FIG. 3c are views, respectively, of the double blade cutting helix, of the counter-blade and of the centring stirrup of the driving shaft of the device according to the invention, each item being shown developped in a plan before being shaped.
Figure 6A:
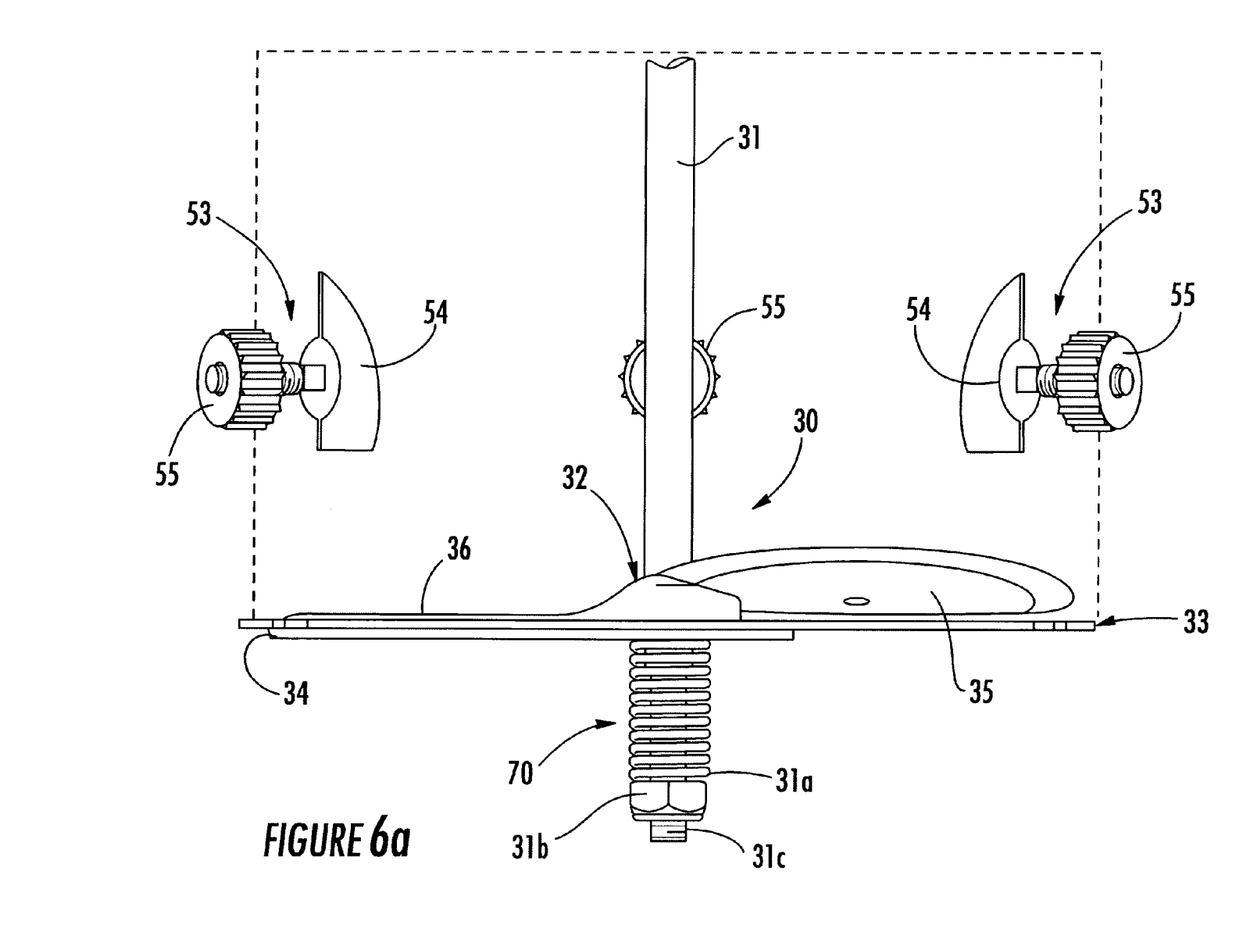
Figure 6B:
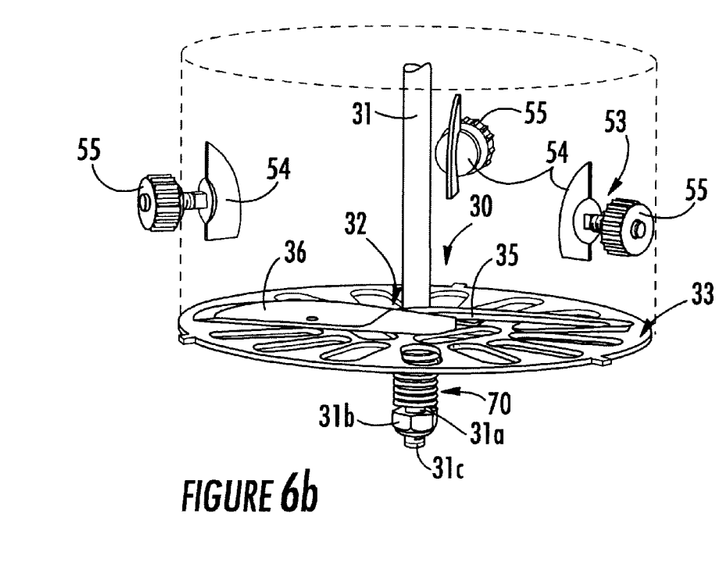
FIG. 6b and FIG. 6c are a bottom and a top perspective view, of the double blade cutting helix, of the counter-blade and of the pierced disk shown mounted together on the lower end of the shaft of the bait grinder.
Figure 6C:
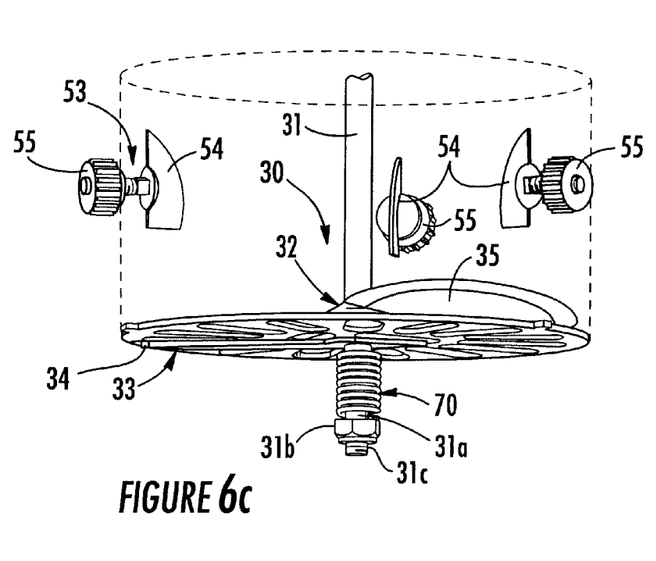

The cutting means 30 (see also FIG. 6a, FIG. 6b and FIG. 6c) are arranged at the lower end of a shaft 31 intended to occupy the central position of the axis of the housing 11. Such cutting means, which will be disclosed in detail hereinafter, are thus intended to be driven by the rotation of the shaft 31. To that effect, it is provided an electric driving motor 40 equipped with a speed reducer 40a: for example, a low power motor of 5 watts having a speed variable with continuity up to 20 revolutions per minute; such a motor is protected by a housing 41 made from plastic material and comprising a basis 42 and a cover 43. Of course, the basis 42 is pierced so as to allow the fastening of the motor 40 thereto as well as the crossing of the driving shaft 44 therethrough (a seal 45 ensures the watertightness), the connection between the driving shaft 44 and the driven shaft 31 being ensured by a keying spline 31d; the cover 43 is pierced so as to allow the positioning, on the top thereof, of the switch 46 and knob 47 for the speed variation (of course, the base 42 and the cover 43 of the motor housing 41 can be fastened to each other by means of screws 48). The motor housing 41 is also intended to protect the electronic circuit 49, whose design is standard and which controls the motor 40. In order to make easy, on the one hand, the feeding of the bait fish into the fish housing 11 and, on the other hand, the upholdingin its position of the motor housing 41, the upper portion of the cylinder 11 is equipped with a mouthpiece 14 having a bell-shaped rim and being intended to be fastened to the cylinder 11 by means of screws 15. Such a mothpiece 14 is also intended to receive a stirrup 16 for centring the driven shaft 44 (see also FIG. 3c): to that effect, the stirrup 16 is medially provided with a hole 17 for the crossing of the driving shaft 44, whereas laterally it is provided with holes 19 for fastening it by means of screws to the bell-shaped rim of the mouthpiece 14; furthermore, this mouthpiece has a buttonhole 18 for supporting the motor housing 41 and avoiding its rotation with the driving shaft 44. The shape of the stirrup 16 can be better appreciated by looking at FIG. 2, which shows it in prospect, and at FIG. 3c which shows it developped in a plan before shaping it the two wings 16a and 16b are intended to be folded upwards and slightly outwards so as to fit the bell-shaped rim of the mouthpiece 14.

The cutting means 30 comprise a metal helix 32 having a special shape (see also FIG. 5a to FIG. 5d, a pierced metal disk 33, which is intended to close the outlet of the fish housing 11 and along whose inner face slides the helix 32, and a counter-blade 34 intended to slide along the outer face of the disk 33. The helix 32 is a double blade cutting helix comprising two diametrically opposed blades 35 and 36, whose development in a plan (see FIG. 3a) allows to appreciate that the shape of the leading edges 35a and 36a is semicircular, with the centres in 35c and 36c respectively (the plan development of the helix 32 is substantially like an inverted S), whereas the trailing edges are rectilinear. It can be useful to imagine that the helix 32 is obtained from a circle having a given diameter (which is a function of the cylinder diameter), whose two semicircles are shifted along the diameter separating one from the other in opposite directions until a little portion keeps them together. The final shape of the helix 32 is obtained by stamping from the flat configuration shown in FIG. 3a: it can be appreciated from FIG. 5a to FIG. 5d; the stamping has the effect to position the blade 35 in an inclined plane (see in particular FIG. 5d together with FIG. 6a and FIG. 6b), while blade 36 remains in a horizontal plane. The inclination of the blade 35 with respect to the horizontal plane containing the blade 36 is of about 15°, so as to meet the low consumption property required for the bait grinder it is easy to understand that during motion the resistance of the blade 35 increases appreciably with the inclination of this latter (an inclination of 45° must be considered as a maximum value).

The sloping blade 35 of the helix 32 has a triple action: cutting by scything the bait fish fed into the housing 11, driving the thus cutted chunks of fish and pressing these latter against the pierced disk 33, so as to force such chunks to pass through the holes of the disk; the horizontal blade 36 has essentially the function of cutting by shearing off the chunks of fish cutted by scything through the blade 35 and holded back, because of their dimensions, by the holes 33b of the disk 33: the shearing action of the blade 36 is obtained by cooperation with such a disk, better said by cooperation with the tailing edges 33c of the holes 33b, such edges and the blade 36 acting together, during the sliding of this latter on the inner face of the disk 33, as shears (of course, the leading edges 33d of the holes 33b, i.e. the edges of these latter which the horizontal blade 36 faces first during its motion, are not effective from the point of view of the shearing action: in this context, the terms "leading" and "trailing" mean, respectively, "faced first" and "faced last" during motion).

Figure 5A:
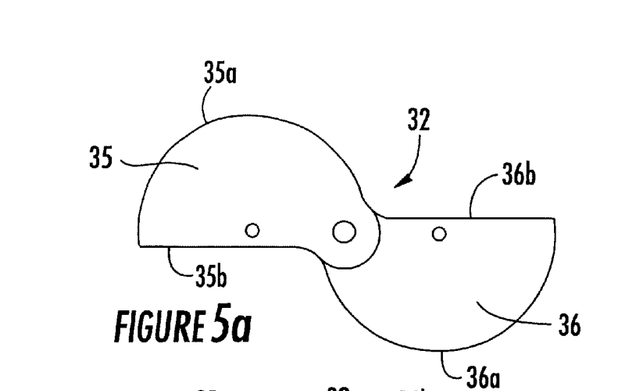
Figures 5B, 5C:
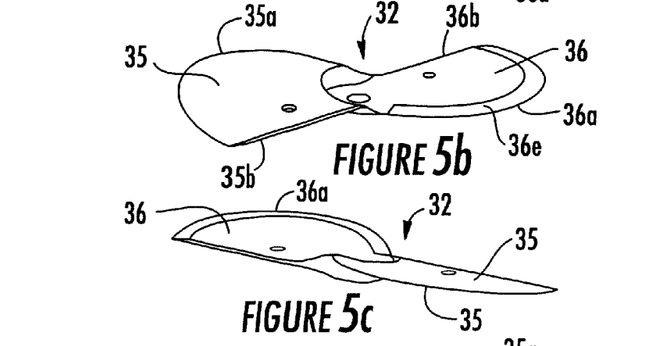
FIG. 5b and FIG. 5c are perspective views of such an helix and FIG. 5d is a front view of the same.
Figure 5D:
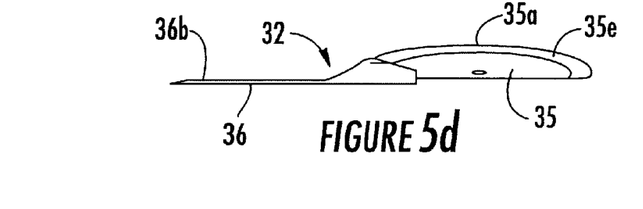

From FIG. 5b to FIG. 5d it is possible to appreciate that the leading edge 35a of the sloping blade 35 is sharp on its lower face, whereas the leading edge 36a of the horizontal blade 36 is sharp on its upper face (see the numerical references 35e and 36e, respectively).

Figure 3B:
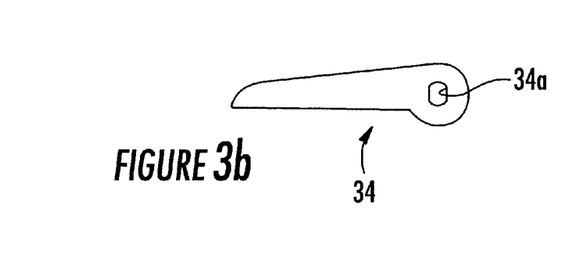
Figure 3C:
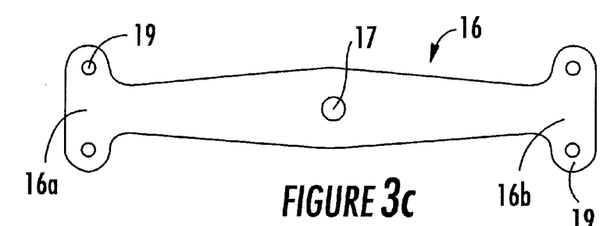
Figures 4A, 4B, 4C:
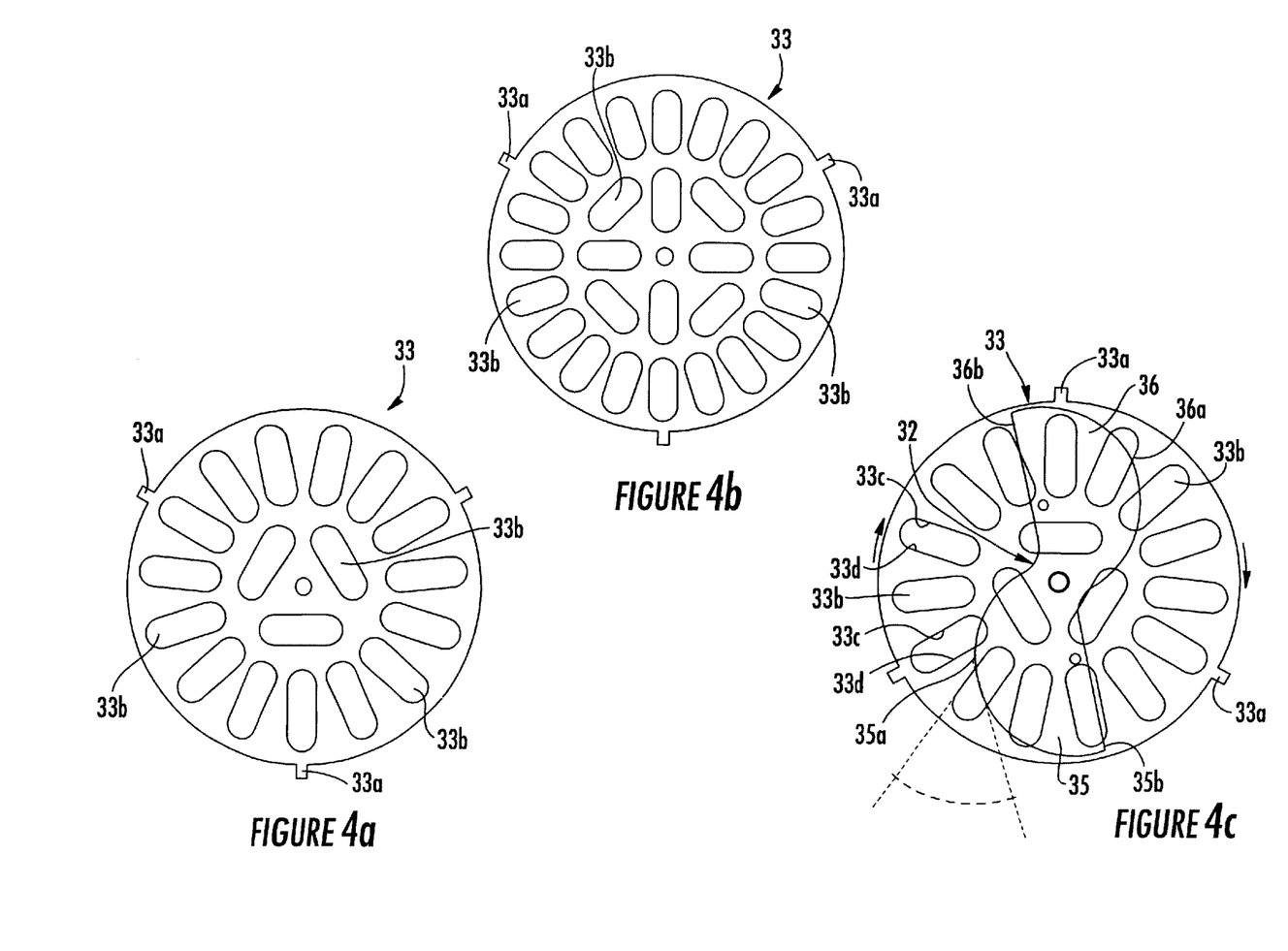

The counter-blade 34 shown in FIG. 3b (see also FIG. 6a and FIG. 6c), which turns together with the double blade helix 32, preserves the filtering action of the disk 33. It is easy to understand that, in order to avoid that the counter-blade 34 opposes the action of the two blades 35 and 36 of the helix 32, it must be positioned correctly under the disk 33, preferably under the lower face of the blade 36 and along the trailing edge 36b of this latter. The double blade 32 is fastened to the driven shaft 31 by soldering, whereas the fastening of the counter-blade 34 to the shaft 31—necessary to drive it together with the helix 32—is obtained by arranging on the distal end of such a shaft an axial seat 31a (see FIG. 6a) on which the counter-blade 34 can be mounted through the complementary hole 34a shown in FIG. 3b: the contour of hole 34a corresponds to that the axial seat 31a, so it is easy to understand that such a seat is obtained by bilateral removal, through a cutter, of two opposite portions of the distal end of the shaft 31 in order to give this latter a section in the form of a quadrilateral surface delimited by two opposed rectilinear sides (the longer ones according to FIG. 3b) and two opposed curved sides (the shorter ones according to FIG. 3b, the curvature being that of shaft 31). A spring 70, coaxial with the seat 31a of the counter-blade 34, retains this latter in contact with the outer face of the disk 33 through the upward pressure of a nut 31b screwed on the thread 31c arranged on the distal end of the shaft 31 before the above mentioned removal of material; in this manner, the spring 70 exerts an upwardly oriented axial pressure on the counter-blade 34 and a downwardly oriented axial pressure on the nut 31b, and thus on the distal end of the shaft 31: this downward pressure ensures the sliding contact between the cutting blade by shearing 36 and the inner face of the disk 33. Furthermore, the spring 70 exerts a useful action on the motor 40 during the motion of the driven shaft 31 because of the absorption of the shocks of the sloping blade 35 against the bait fish or chunks of fish. Without such an absorptive action of the spring 70, these shocks would switch the motor 40 off, while lifting upwardly the shaft 31 together with the driving motor 40; on the contrary, because of the presence of the spring 70, the upward lifting of the shaft 31 compresses this spring which exerts the required absorptive action on the shaft 31 and thus on the motor 40, which can continue turning without stopping. In order to fasten the pierced disk 33 to the housing 11 and thus close the outlet of this latter therethrough, it is useful to use a sleeve 50 made of plastic material (as the motor housing 41 and the fish housing 11 with its mouthpiece 14) which is intended to be put around the lower end of the housing 11 (see FIG. 1 and FIG. 2). In the upper half of the sleeve 50 are arranged thee buttonholes 51 which are oblong and parallel to its axis and set equally apart at 120° one from the next three radial projections 33a—they also spaced equally apart (see FIG. 4a)—of the disk 33 can slide along these buttonholes 51 so as to rest on the closed end thereof; in this position, the disk rests also on a toroidal rib 56 (see FIG. 2 in which a portion thereof can be seen in prospect) which projects from the inner wall of the sleeve 50. The fastening of this latter to the housing 11 is obtained by means of three horizontal buttonholes 52, each one being arranged in the wall of this sleeve perpendicularly to the vertical buttonholes 51 and in communication therewith. From the interior of the housing 11 can be introduced three screws 53, having a special design (see also FIGS. 6a to 6c), into the buttonholes 52, of course through three corresponding holes arranged in the lower portion of the housing 11 and set equally apart at 120° one from the next; the head 54 of each screw 53 leans into the cavity delimited by the housing 11 and has been designed like a little spatule so as to confer thereto the function of compensating the weight reduction of the column of bait fish inside the housing 11: in fact, as the quantity of bait fish reduces, the weight of the bait fish above the cutting means 32 reduces too; now, this weight is necessary to exert a stopping action on the bait fish immediately above the cutting means 32 and thus rendering effective the cutting action thereof; on the contrary, when the height of the column of bait fish reduces, the weight thereof reduces too, until the height and thus the weight are not sufficient to exert the necessary stopping action on the residual bait fish, which thus escape the action of helix 32. The heads 54 leaning inside the housing 11 are effective to stop the bait fish column above the cutting means, especially when the height of this later reduces to the level of these stopping means 54. The threaded end of the screws 53 which protrudes outside the housing 11, from the buttonholes 52, is intended to receive a nut 55 allowing the fastening of the sleeve 50 to the housing 11. As regards the holes arranged in the disk 33, see FIG. 4a and FIG. 4b which show two embodiments given by way of example only. In FIG. 4a a plurality of identical oblong holes 33b are arranged circularly in the peripheric portion of the disk with their axis aligned with the disk centre, whereas in the central portion of this latter are arranged three holes identical to the former according to the sides of an equilateral triangle centred around the disk centre. In FIG. 4b the arrangement of the holes in the peripheric portion of the disk is the same as in FIG. 4a with the difference that the holes are smaller it is thus possible to arrange in the central portion of the disk eight identical holes according to the sides and the diagonals of a square centred around the disk centre. Of course, other arrangements of the disk holes are possible with holes having the same size or not; anyway, what matters is that the oblong leading and trailing edges 33d and 33c of each hole 33b are never perpendicular to the leading edge of the horizontal blade 36: this requirement is necessary so as to ensure that the blade 36 exerts a shearing action on the chunks of fish retained in the holes, against the trailing edge 33c thereof. It can be appreciated that the semicircular profile of both the horizontal blade 36 and the sloping blade 35 aims at facing gradually the bait fish to be cutted, thus reducing the motor power and the energetic consumption as well: this can be better appreciated on FIG. 4c, where it is indicated in dotted line the angle according to which the semicircular leading edge of a cutting blade of the helix 32 faces the trailing edge of a disk hole. The oblong character of the housing 11 allows the bait fish column to exert the above mentioned stopping action on the bait fish immediately above the helix 32 and to obtain a satisfactory operation range: with a motor of the type indicated above and a housing having a diameter of 14 cm and a height of 40 cm (corresponding to about 3.5 kg of bait fish) the operation range is of the order of 1.5 hours.

The bait grinder can be equipped with protection means preventing accidental contacts with the cutting means 30. Such protection means comprise a sleeve 60 (see FIG. 1 and FIG. 2), which is coaxial with the sleeve 50 supporting the pierced disk 33 and intended to be put partially inside this latter sleeve, to which it is fastened by screw and nut means 61. The protection sleeve 60 is intended to support three little stems 62 which constitute a sort of protection grate: they are arranged so as to be parallel to each other with their ends inserted in corresponding holes of the sleeve 60, the distance between the stems 62 allowing the grinded bait fish to pass therebetween while avoiding the accidental introduction of the hands of an operator.

On the basis of the above description, it is possible to appreciate that the low value of revolutions per minute of the motor shaft, together with the following features, such as: the oblong character of the fish housing, which ensures the obtention of a fish column above the cutting means having a height sufficient to compensate the low speed of the motor shaft; the arrangement of the cutting means at the lower end of the driven shaft and not on the whole length of this latter, the design of the cutting means, which act by scything (thus involving progressively a minimum quantity of bait fish) and by shearing (thus involving the residual chunks of fish escaped to the means cutting by scything, while ensuring the filtering function from inside the fish housing); the filtering action of the counterblade outside the fish housing (during the reduction to practice of the bait grinder according to the present invention, it has turned out that without the counterblade its operation becomes impossible); the progressive character of the cutting ensured by a suitable profile of the leading edge of the means cutting by scything and by shearing; as well as the shock absorption ensuring a continuous operation of the motor without undesirable stopping thereof, contribute individually and in combination to make the grinder a low consumption device, which is very important in this field

What is claimed is:

1. A bait grinder configured for low energy consumption and for low speed operation, adapted for use in a fishing craft for cutting bait fish into chum bait and for further grinding the chum bait, comprising:
    a housing having a substantially vertical axis, an inlet intended for the introduction of the bait fish, and an outlet intended for the ejection thereof after reducing the bait fish into chum bait;
    means for fastening the housing to the craft in a substantially vertical position;
    a vertical shaft having a lower end and an upper end and being intended to occupy a position coincident with the vertical axis of the housing;
    means fastened to the shaft for cutting the fish bait;
    means for driving the shaft;
    said housing being intended to feed the bait fish towards the cutting means under the action of gravity,
    filtering means closing the outlet of the housing;
    means cooperating with the filtering means for keeping the filtering function thereof, and wherein said cutting means are fastened to the lower end of the shaft and comprise:
        means for cutting by scything the bait fish at the level of the lower end of the shaft, which scything cutting means are also means for driving and compressing the chum bait so as to grind the chum bait against the filtering means, and
        means for cutting by shearing residual chum bait cut by the scything cutting means and retained by the filtering means, which shearing cutting means are arranged for keeping a sliding contact with the filtering means.

2. The bait grinder as claimed in claim 1, wherein the scything cutting means and the shearing cutting means have a leading edge whose profile allows to face progressively the bait fish to be cut.

3. The bait grinder as claimed in claim 1, further comprising elastic means for forcing the keeping of a sliding contact, on the one hand, between the means for keeping the filtering function of the filtering means and the filtering means and, on the other hand, between the filtering means and the shearing cutting means, said elastic means further ensuring a shock absorption during the motion of the means.

4. The bait grinder as claimed in claim 1, further comprising means for stopping the bait fish immediately above the cutting means as the quantity thereof decreases during operation.

5. The bait grinder as claimed in claim 1, wherein said filtering means comprise a pierced disk in which a plurality of holes are arranged and which is fastened to the housing; wherein the cutting means comprise a double blade helix; wherein said scything cutting means consist of a first blade of the double blade helix which is sloping with respect to the pierced disk, whereas said shearing cutting means consist of a second blade of the double blade helix which is horizontal and in sliding contact with an inner face of the pierced disk; wherein said means for keeping the filtering function of the pierced disk comprise a counter-blade fastened to the lower end of the shaft and in sliding contact with an outer face of the pierced disk, and wherein the profile of the sloping and horizontal blades is semicircular.

6. The bait grinder as claimed in claim 5, wherein an axial seat is arranged at the lower end of the shaft which is intended to fit a complementary hole arranged in the counter-blade so as to allow the driving thereof during motion together with the double blade helix, and wherein said forcing and shock absorption elastic means comprise a spring coaxial with the axial seat of the counter-blade, which spring is kept in contact with this counter-blade through a nut threaded around the lower end of the shaft.

7. The bait grinder as claimed in claim 5, wherein the pierced disk is fastened to the housing through fastening means consisting of a sleeve coaxial therewith, which is intended to be put around a lower end of the housing and in an upper portion of which are arranged three vertical buttonholes set equally apart at 120° one from the next and intended to receive a corresponding radial projection of the pierced disk.

8. The bait grinder as claimed in claim 7, wherein the housing has a toroidal rib projecting from an inner wall thereof and supporting the pierced disk.

9. The bait grinder as claimed in claim 8, wherein the upper portion of the coaxial sleeve fastening the pierced disk to the housing comprises three horizontal buttonholes in communication with the vertical buttonholes supporting the radial projections of the pierced disk and intended to receive three screws for fastening the coaxial sleeve to the housing, which fastening screws have a head: leaning inside the housing, whereas a threaded end of each fastening screw protrudes outside the housing so as to receive a fastening nut.

10. The bait grinder as claimed in claim 9, wherein said head of the fastening screw leaning inside the housing acts as stopping means of the bait fish immediately above the cutting means.

11. The bait grinder as claimed in claim 1, wherein the housing inlet is equipped with a mouthpiece having a bell-shaped rim facilitating feeding the bait fish into the housing and supporting the driving means, protected by its own motor housing, through a stirrup configured for centering a driving shaft projecting downwardly from the driving means, and wherein a buttonhole is arranged in the bell-shaped rim of the mouthpiece so as to avoid rotation of the motor housing while supporting this latter.

12. The bait grinder as claimed in claim 1, further comprising means for protection against accidental contact with the cutting means, which protection means comprise a protection sleeve coaxial with the housing and the fastening sleeve and intended to be put partially inside this fastening sleeve and to be fastened thereto, the protection sleeve being equipped at a lower end thereof with a protection grate.

* * * * *

UNITED STATES PATENT AND TRADEMARK OFFICE
CERTIFICATE OF CORRECTION

PATENT NO.      : 6,581,322 B1
DATED           : June 24, 2003
INVENTOR(S)     : Spinelli It is certified that error appears in the above-identified patent and that said Letters Patent is hereby corrected as shown below:

<u>Title page,</u>
Item [30], Foreign Application Priority Data, "BA99A0027" should read
-- BA99A000027 --.

Item [57], ABSTRACT,
Line 4, after "to" insert -- a --;
Line 7, before "(30)" insert -- means --; "mean" should read -- means --; after "(35)" insert a dash (-);
Line 9, "mean" should read -- means --;
Lines 11-12, cancel "for cutting residual chum bait retained by the filtering means (33)".

<u>Column 8,</u>
Line 7, after "head" cancel the colon (:).

Signed and Sealed this

Seventh Day of October, 2003

JAMES E. ROGAN
*Director of the United States Patent and Trademark Office*